United States Patent [19]

Heisey

[11] 3,909,407
[45] Sept. 30, 1975

[54] TREATMENT OF WOOL SCOURING WASTES

[75] Inventor: Willis A. Heisey, Denver, Pa.

[73] Assignee: Geo. W. Bollman & Co., Inc., Adamstown, Pa.

[22] Filed: Sept. 30, 1974

[21] Appl. No.: 510,246

Related U.S. Application Data

[63] Continuation-in-part of Ser. No. 347,126, April 2, 1973, abandoned.

[52] U.S. Cl. ...................... 210/49; 210/53; 210/56; 8/141
[51] Int. Cl.² .......................................... C02B 1/20
[58] Field of Search ........................ 210/49, 51–53, 210/56, 59, 60, 43–45, 42, 73, 71, 66; 8/139, 139.1, 141

[56] References Cited
UNITED STATES PATENTS

| | | | |
|---|---|---|---|
| 2,429,868 | 6/1946 | Campanella | 8/139 |
| 2,762,681 | 9/1956 | Crowley | 210/52 |
| 2,903,424 | 9/1959 | Fong | 8/139 |
| 3,419,493 | 12/1968 | Pangle, Jr. | 210/44 |
| 3,677,940 | 7/1972 | Fujimoto et al. | 210/44 |

Primary Examiner—Thomas G. Wipe
Assistant Examiner—Benoit Castel
Attorney, Agent, or Firm—James J. Kennedy

[57] ABSTRACT

A method of continuously treating wool scouring wastes in which the scouring liquor at an elevated temperature is acidified and treated with bentonite while continuously mixing, treating the acidulated liquor with lime and flocculating while continuously mixing, again at an elevated temperature, and finally the conditioned mixed liquor is transferred to a settling tank where the sludge is removed for further treatment and clear liquid is drawn off for discharge into a sewer system.

4 Claims, 1 Drawing Figure

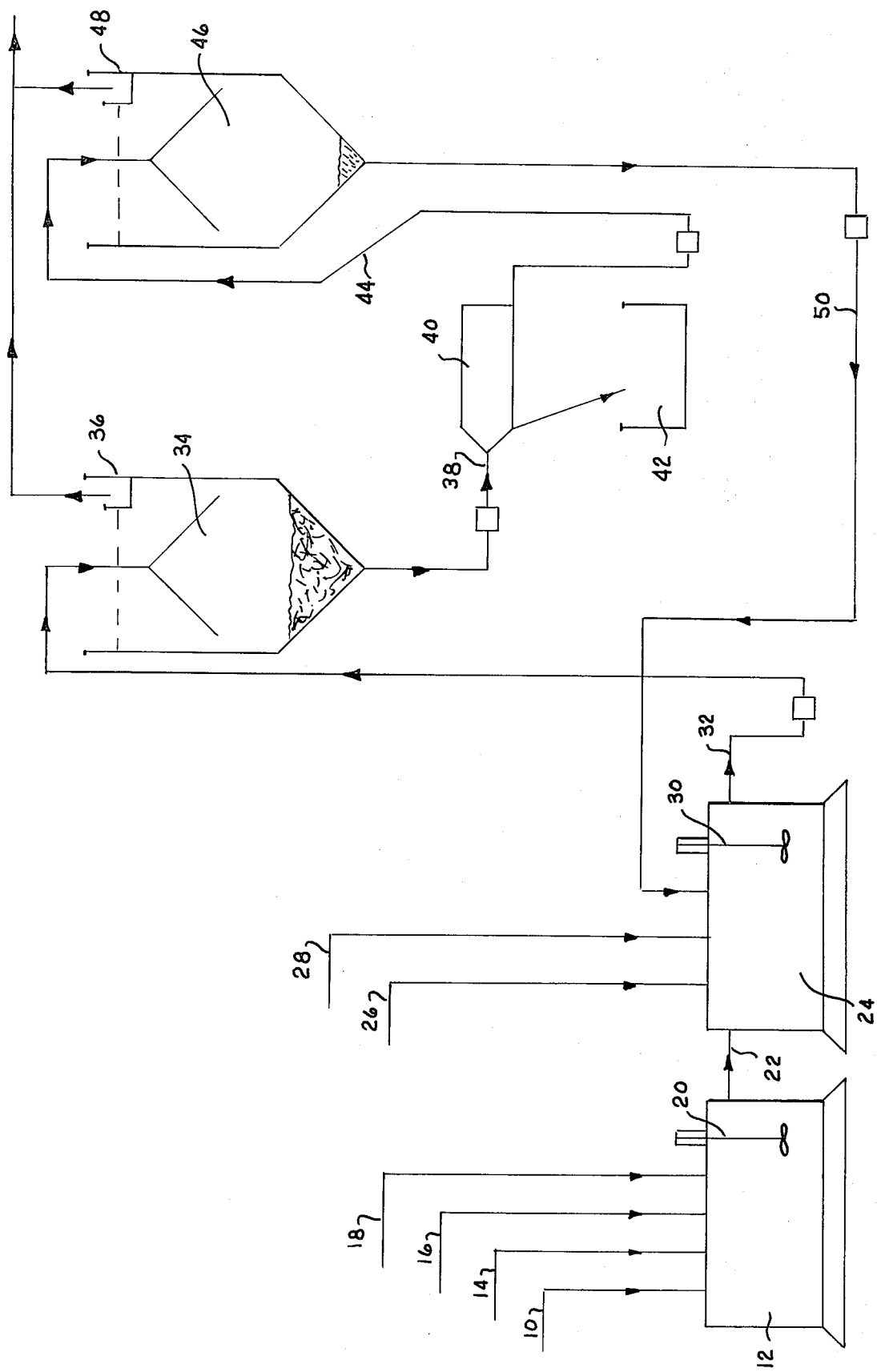

TREATMENT OF WOOL SCOURING WASTES

This is a continuation-in-part application of application Ser. No. 347,126, filed Apr. 2, 1973, and now abandoned.

BACKGROUND OF THE INVENTION

This invention relates to a method of treating for disposal wool scouring wastes and more particularly, to a process for continuous waste treatment which produces a compact, conditioned, rapidly settling sludge and a supernatant liquor containing soluble, biodegradable liquors so that the sludge can be centrifugally separated to permit conventional disposal or solvent extracted to recover the grease.

As is well known in the art, raw wool cannot be used directly in any textile operation, because of the many varied impurities it contains. Before it is suitable for use, the wool must first be cleaned or scoured to remove these impurities. Generally speaking, the impurities in raw wool include vegetable matter, dirt, sand, animal waste matter, paint (used to brand the animal), wool grease (a complex water-insoluble mixture which protects the wool fibers during growth) and suint (a water soluble material secreted by the animal's sweat gland). The scouring process to remove these impurities is usually carried out at an elevated temperature by passing the raw wool through a series of bowls or tanks containing a suitable detergent, while alternately squeezing the wool between suitable rolls. The resulting liquor from this washing and squeezing process produces one of the most polluted wastes known to the textile industry.

The wool scouring waste is comprised of all the impurities described above, plus the deterging chemicals which were used in the wash solution. Because of the very high percentage of grease and organic wastes, the resulting waste liquor, by law, cannot be discharged directly into open bodies of water, nor into most municipal sewerage operations, unless the waste is treated or conditioned to reduce its chemical oxygen demand (COD), the measure of pollution, to a range within acceptable limits.

In the past, the wool scouring wastes have been treated in a number of different ways, including the acid cracking methods and centrifugal processes. Still others have subjected an acidified liquor to filtration with a plate and frame press. None of these previously known methods are completely acceptable, because they do not sufficiently reduce the pollution levels and because of the difficulty of dewatering the remaining sludge.

The most common of the treating methods is the centrifugal method. It employs a high speed centrifuge to mechanically separate a sludge from a clarified liquor. These systems alone, however, seldom recover much more than 30% of the total of the grease waste materials and usually none of the dissolved organic matter of the waste liquor. Additional treatment is necessary on both sludge and liquor before they will be acceptable for non-polluting discharge.

In the usual acid cracking process, the scouring liquors are broken down by the addition of an acid, usually sulfuric, to bring the liquor to a pH in the range of 3.5. By this process, the wool grease, dirt and other solids are caused to settle out. The solid waste is then further treated to remove the grease through a filtration process. This process removes about 50% of the grease from the total wastes and from that standpoint, especially in relation to the centrifugal process, acid cracking is more efficient. The process still, however, gives inadequate purification and certainly would not be acceptable from the standpoint of the regulations relating to effluent discharge which apply today. The residual organic and acid content is still too high.

To overcome the deficiencies of known methods of treatment of wool scouring wastes, it is the primary object of this invention to produce a supernatant liquor and a conditioned non drainable sludge which rapidly, gravity settles so that the supernatant liquor can be discharged directly into a municipal sewer system at acceptable COD levels and the sludge can be continuously and efficiently separated by a solid bowl centrifuge into disposable liquid and solid constituents.

Another object of the invention is to provide a commercially acceptable method of treating heavy pollutants on a continuous basis without a high degree of labor or excessive chemical costs.

A further object of the invention is to provide a method which will produce sufficient purification of both the liquid and solid components of the wool scouring wastes to permit discharge of these components by conventional methods.

DESCRIPTION OF THE INVENTION

The process of the invention is further explained in connection with the attached drawing which illustrates a flow diagram of the process.

The raw wool is first scoured using conventional processes to remove the wool grease, earthy materials, suint, detergents and other impurities. Wool scouring liquor is then drawn off from the wool bowls anad dischraged as at 10 into a tank 12. The raw waste liquor has been heated to approximately 150°–160°F during the scouring process. For best results in the processing, this heated waste liquor is continuously drawn off, preheated to approximately 180°F and delivered to tank 12, known as the acidulation tank. In the acidulation tank 12, the raw scouring waste liquor is mixed with an appropriate acid, such as sulfuric acid, which is introduced in controlled fashion from a source 14 to produce a pH range of 3.0–3.5. The addition of the acid causes a portion of the grease to settle out of the liquid. Live steam may be introduced into the tank through an appropriate conduit 16. The introduction of the live steam causes the temperature of the waste liquor to be elevated from its preheated temperature of 180°F to a temperature in the range of 180°–200°F. The particular temperature employed by the process is dependent in large measure upon the initial COD levels. Process wastes from a wool noil scouring operation, a less polluted waste, may be treated in a temperature range of 160°–170°F, thus not necessarily requiring a preheating operation. In that cases, the steam would be used to maintain the temperature level.

The introduction of live steam has the additional advantage of causing an agitation of the tank 12 contents, and this is a desirable result to prevent settling during this operation. It is not essential, however, that live steam be used, since the agitation can be achieved by mechanical means. The elevated temperature could be achieved and maintained just as well by inserting a steam coil in the tank and providing suitable mechanical agitation.

At the same time that new raw scouring liquors are being acidulated and heated, bentonite, of any commercial grade, is being added to the liquor from a dry bentonite feeder 18 located above the tank 12. The bentonite is a clay like material which has proven absorption ability and its addition to the waste liquor results in an absorption of the soluble materials from the waste liquor, causing greater initial separation and, thereby, reducing the initial COD of the waste liquor. The process will, however, work to produce a conditioned non drainable sludge without the addition of the bentonite, but its elimination is at the expense of a higher final COD of the liquor being treated. Example II set forth hereinafter illustrates this fact.

The amount of bentonite being added to the treated liquor is controlled by the mechanical feeder which acts in response to the volume of flow of liquor into tank 12. Generally, it is desirable to feed the bentonite in dry powder form at a rate which will yield a concentration of approximately 0.3% based on the weight per unit volume of the liquor being treated.

The conditions are maintained and the flow rate of all constituents being added to tank 12 are constantly monitored so that a continuous flow through the acidulation tank yields a minimum retention time of the waste liquor in the tank of 15 minutes during the acidulation step. During this entire time, the contents of the tank are agitated by appropriate mechanical means 20. The acidulated liquor passes from tank 12 through a conduit 22 by appropriate means which may include gravity feed, overflow or pumping to a second tank 24, known as the flocculation tank.

In the flocculation tank 24, again in a continuous process, the temperature of the acidulated liquor is maintained at an elevated temperature in an appropriate range depending upon the initial level of pollution in a range of 180°–200°F by the introduction of live steam 28 or a coil circulated system. It has been found that for wool scouring wastes the ideal acidulator and flocculator temperature is about 200°F. For less polluted wastes, such as noil scouring wastes, the flocculation temperature need only be in the range of 180°–190°F. Lime is added as a dry powder to the tank 24 from a mechanical feeder 26. As with the bentonite, the lime is added at a rate related to the weight per unit volume of the liquor being treated, but it has been found that best results are achieved if the amount of lime is kept in the range of 0.5–1.25% of weight to volume concentration for all types of pollutants.

The addition of the lime to the acidulated liquor and the flocculation process produces a conditioned sludge which is retained in tank 24 for a minimum of 15 minutes through a controlled flow rate through the system. During this entire time, the contents of the tank are being continuously stirred by mechanical means 30 to mix the lime with the liquor and to prevent the sludge from settling out prematurely. The lime, in combination with the elevated temperature of the tank contents, destroys the peptizing agents which normally produce a poor settling floc.

The conditioned sludge is pumped through a conduit 32 to a cone settling tank 34 which has been fitted with a steam jacket to maintain the tank and its contents at a temperature of approximately 200°F during the wool scouring waste treatment process. In tank 34, the conditioned sludge is permitted to settle and separate so that the solid materials drop to the bottom of the cone tank, while a supernatant liquor comes to the top. The settled, non drainable sludge material is pumped or otherwise removed from the bottom of the tank 34. The supernatant liquor is removed by a weir overflow 36 near the top of the tank and can be dischraged directly to a sewer treatment plant, municipal or otherwise. Retention time in tank 34 is approximately 1 hour.

The settled sludge is continuously pumped from the tank 34 through appropriate piping 38 into a solid bowl centrifuge 40 where it is separated into solid and liquid constituents, the solids are removed and collected in a suitable container as at 42, and may be trucked away to a landfill or other disposal area. The remaining concentrate will contain less than 0.1% solids and may be pumped through piping 44 to a secondary clarifier 46 for further treatment by permitting further settling, or the concentrate may be discharged directly into a municipal sewer system. If the concentrate is delivered to the secondary clarifier 46, the concentrate is allowed to settle for approximately an hour, yielding a clear effluent which comes to the top and is removed by a weir overflow 48 and discharged into a sewer system. The solids are drawn off and pumped through appropriate piping 50 to the flocculator 24 for further processing. The settled solids remaining in the effluent are less than 0.01%.

Less polluted waste effluents can be treated using the same process as described. It is not necessary, however, to elevate the temperature of the liquor being treated to such high levels. With less polluted wastes the acidulator temperature may be kept in a range of 160°–170°F and the flocculator temperature in the range of 180°–190°F. The lime content in the flocculator can be kept in the range of 0.3–0.5%. The process followed to produce the conditioned sludge is generally the same, as has been previously stated, except that the preheating step between the wash and the acidulator may not be necessary.

Whether the liquor being treated is highly or only moderately polluted, the process herein described will remove in excess of 99% of the solids from the sludge in a relatively simple, effective and economic manner. The process represents a practical solution for disposal of grease wool scouring wastes. The process is flexible in that it can easily be modified to handle textile wasted containing a lesser concentration of pollutants.

The several examples set forth hereinafter illustrate the process under specific conditions showing the production of non drainable solids.

EXAMPLE I

By way of example, the previously disclosed process is used to treat the wool scouring wastes of a fine domestic wool containing 15% wool grease and 15% suint salts which have been heated to 150°F under neutral scouring conditions and have a COD level of 85,000 ppm. The total waste was continuously treated and flowed into a tank equipped with a mixer, a pH controller set for a range of 3.0–3.5 and steam coils with a temperature controller to operate at 190°–200°F. A dry bentonite feeder was located above the tank for bentonite addition. The tank was fitted with a lid having an opening and a fitting allowing bentonite addition (0.3% W/V concentration) and a scrubber to remove steam vapor. Conditions are maintained so that continuous flow through the acidulation tank allowed a minimum retention time of 15 minutes; the acidulated liquor gravity flowed into the flocculator equipped with a mixer, dry lime feeder and vapor exhaust pipe to the scrubber. Lime was dropped into the liquor to give 1.0–1.3% (W/V) concentration.

The minimum retention time in the flocculator at 190°–200°F is 15 minutes. The liquor is centrifugally pumped to a cone settling tank where the bottom sludge is continuously pumped through a solid bowl centrifuge, resulting in an effluent containing less than 0.1% solids and a centrate with a COD of 11–12,000 ppm (initial COD, 85,000 ppm). This centrate is pumped into a secondary cone clarifier equipped with a weir overflow and bottom valve. Settled sludge is continuously returned to the flocculator.

See Table I below showing the effect of temperature and lime addition to produce a non drainable (dewatered) sludge from wool grease scouring liquors as described in Example I above.

TABLE I

| % Lime in Floc. | Temp. °F Acid. 180° | Temp. °F Floc. 200° | Solids Drain-ability | % COD Red. | Temp. °F Acid. 190° | Temp. °F Floc. 200° | Solids Drain-ability | % COD Red. |
|---|---|---|---|---|---|---|---|---|
| | COD ppm | | | | COD ppm | | | |
| 0.0 | 32,000 | | D* | 62 | 27,000 | | D | 68 |
| 0.25 | 29,000 | | D | 66 | 20,000 | | D | 76 |
| 0.50 | 27,800 | | D | 67 | 14,000 | | D | 84 |
| 1.00 | 27,000 | | D | 68 | 12,000 | | ND** | 86 |
| 1.50 | 25,000 | | D | 71 | 11,000 | | ND | 87 |
| 2.00 | 18,000 | | D | 79 | 11,000 | | ND | 87 |

| % Lime in Floc. | Temp. °F Acid. 200° | Temp. °F Floc. 200° | Solids Drain-ability | % COD Red. |
|---|---|---|---|---|
| | COD ppm | | | |
| 0.0 | 27,000 | | D | 68 |
| 0.25 | 20,000 | | D | 76 |
| 0.50 | 13,000 | | ND | 85 |
| 1.00 | 11,000 | | ND | 87 |
| 1.50 | 11,000 | | ND | 87 |
| 2.00 | 11,000 | | ND | 87 |

*Drainable, nonrecoverable solids
**Nondrainable, recoverable solids

EXAMPLE II

Wool scouring wastes were heated to 150°F under neutral scouring conditions with an initial COD level of 85,000 ppm. The total waste was continously treated and flowed into a tank equipped with a mixer, a pH controller set for a pH range of 3.0–3.5 and steam coils with a temperature controller to operate at 190°–200°F. A scrubber was used to remove steam vapors. Conditions are maintained so that a continuous flow through the acidulation tank allowed a minimum retention time of 15 minutes; the acidulated liquor gravity flowed into the flocculator equipped with a mixer, dry lime feeder and a vapor exhaust pipe to the scrubber. Lime was added to the liquor to give a 1.0–1.3% W/V concentration. The minimum retention time in the flocculator at 190°–200°F was 15 minutes. The flocculated liquor is pumped into a cone settling tank where at the bottom sludge is continuously pumped through a solid bowl centrifuge. Retention time in the settling tank is approximately one hour. The concentrate is pumped into a secondary cone clarifier equipped with a weir overflow and bottom valve. The settled sludge is continuously returned to the flocculator.

Table II, below, shows the effect of temperature and lime at a prescribed pH level through a wide range according to Example II above to produce a non drainable, dewaterable sludge from wool scouring liquors.

TABLE II

| % Lime in Floc. | Temp. °F Acid. 180° | Temp. °F Floc. 200° | Solids Drain-ability | % COD Red. | Temp. °F Acid. 190° | Temp. °F Floc. 200° | Solids Drain-ability | % COD Red. |
|---|---|---|---|---|---|---|---|---|
| | COD ppm | | | | COD ppm | | | |
| 0.0 | 35,000 | | D* | 59 | 31,000 | | D | 62 |
| 0.25 | 33,000 | | D | 61 | 25,000 | | D | 70 |
| 0.50 | 32,000 | | D | 62 | 18,000 | | D | 79 |
| 1.00 | 31,000 | | D | 62 | 16,000 | | ND** | 81 |
| 1.50 | 29,000 | | D | 66 | 14,000 | | ND | 84 |
| 2.00 | 21,000 | | D | 75 | 14,000 | | ND | 84 |

| % Lime in Floc. | Temp. °F Acid. 200° | Temp. °F Floc. 200° | Solids Drain-ability | % COD Red. |
|---|---|---|---|---|
| | COD ppm | | | |
| 0.0 | 31,000 | | D | 62 |
| 0.25 | 25,000 | | D | 70 |
| 0.50 | 18,000 | | ND | 79 |
| 1.00 | 16,000 | | ND | 81 |
| 1.50 | 14,000 | | ND | 84 |
| 2.00 | 14,000 | | ND | 84 |

*D Drainable, nonrecoverable solids
**D Nondrainable, recoverable solids

Pulled wool scouring waste liquors, an example of a less polluted wool scouring waste, can be chemically flocculated and the dewatered, nondrainable solids removed as described in Example II above. The initial COD of the waste liquor may range from 20,000 to 40,000 ppm, yielding a treated effluent of approximately 4000 ppm COD. The ideal percent of lime required in this process may vary between 0.5–0.7% (W/V) producing solids from a solid bowl centrifuge of 40% moisture.

EXAMPLE III

Following the process described in Example II, a pulled wool scouring liquor, having an initial pollution level of 20,000 ppm COD, is acidified to achieve a pH of 3.4. The acidulator temperatures are varied between 160° to 190°F, while the flocculator is maintained at 200°F. The lime concentration is varied from 0.0 to 1.5% (W/V). Bentonite is not added. The retention time in each tank (the acidulator and flocculator) is approximately fifteen minutes. The nondrainable solids are produced as shown in Table III below.

TABLE III

| % Lime in Floc. | Temp. °F Acid. 160° | Temp. °F Floc. 200° | Solids Drain-ability | % COD Red. | Temp. °F Acid. 170° | Temp. °F Floc. 200° | Solids Drain-ability | % COD Red. | Temp. °F Acid. 180° | Temp. °F Floc. 200° | Solids Drain-ability | % COD Red. |
|---|---|---|---|---|---|---|---|---|---|---|---|---|
| | COD ppm | | | | COD ppm | | | | COD ppm | | | |
| 0.0 | 7,000 | | D* | 65 | 7,000 | | D | 65 | 7,000 | | D | 65 |
| 0.25 | 3,000 | | ND** | 85 | 3,000 | | ND | 85 | 3,000 | | ND | 85 |
| 0.5 | 2,000 | | ND | 90 | 2,000 | | ND | 90 | 2,000 | | ND | 90 |

TABLE III – Continued

| % Lime in Floc. | Temp. °F Acid. 160° Floc. 200° COD ppm | Solids Drainability | % COD Red. | Temp. °F Acid. 170° Floc. 200° COD ppm | Solids Drainability | % COD Red. | Temp. °F Acid. 180° Floc. 200° COD ppm | Solids Drainability | % COD Red. |
|---|---|---|---|---|---|---|---|---|---|
| 1.0 | 2,000 | ND | 90 | 2,000 | ND | 90 | 2,000 | ND | 90 |
| 1.5 | 2,000 | ND | 90 | 2,000 | ND | 90 | 2,000 | ND | 90 |

*Drainable solids
**Nondrainable solids

EXAMPLE IV

The process described in Example III above is repeated with a second pulled wool scouring waste liquor having an initial pollution of 34,000 ppm COD. Bentonite is not added to the process. The pH level in the acidulator is approximately 3.4. The retention time in each tank is approximately 15 minutes. The temperature in the acidulator is varied between 160° to 190°F. A temperature of the flocculator is maintained at 200°F. The lime concentration is again varied between 0.0 and 1.5% (W/V). The non-drainable solids are produced as shown in Table IV below.

TABLE IV

| % Lime in Floc. | Temp. °F Acid. 160° Floc. 200° COD ppm | Solids Drainability | % COD Red. | Temp. °F Acid. 180° Floc. 200° COD ppm | Solids Drainability | % COD Red. | Temp. °F Acid. 190° Floc. 200° COD ppm | Solids Drainability | % COD Red. |
|---|---|---|---|---|---|---|---|---|---|
| 0.0  | 12,000 | D*   | 64 | 12,000 | D  | 64 | 12,000 | D  | 65 |
| 0.25 | 9,500  | D    | 72 | 6,000  | D  | 82 | 5,800  | D  | 83 |
| 0.5  | 4,000  | D    | 87 | 4,500  | D  | 87 | 4,000  | ND | 88 |
| 1.0  | 4,000  | D    | 87 | 3,600  | ND | 89 | 3,600  | ND | 89 |
| 1.5  | 3,600  | ND** | 89 | 3,600  | ND | 89 | 3,600  | ND | 89 |

*Drainable solids
**Nondrainable solids

I claim:

1. A continuous process for treating wool scouring waste liquors having at least 20,000 ppm COD comprising, in combination:
   acidulating in a tank and maintaining in a pH range of 3.0–3.5 a continuously flowing, constantly agitated, scouring waste liquor heated to a temperature in the range of 160° to 200°F at a flow rate through the tank yielding an approximate retention time of 15 minutes in the tank;
   adding lime at a weight to volume concentration in the range of 0.5–1.25% and flocculating the continuously flowing, constantly agitated, heated acidulated waste liquor in a second tank forming a conditioned sludge at a flow rate through the tank yielding an approximate retention time of 15 minutes in a second tank;
   separating the conditioned sludge in a heated settling tank maintained at approximately 200°F to form a disposable supernatant liquor and a settled non drainable sludge; and
   centrifugally separating the settled non drainable sludge to form disposable liquid and solid constituents, where the temperature during the acidulating step and the weight to volume concentration of lime are selected from the ranges described to obtain a non drainable sludge.

2. A continuous process for treating wool scouring waste liquors as set forth in claim 1, wherein the waste liquor is maintained at a temperature of approximately 200°F during the flocculating step.

3. A continuous process for treating wool scouring waste liquors as set forth in claim 1, including the additional step of adding bentonite in a weight to volume concentration of approximately 0.3% during the acidulation step.

4. A continuous process for treating wool scouring waste liquors comprising, in combination:
   adding acid maintaining a pH range of 3.0–3.5 and bentonite at a rate to yield a weight to volume concentration of 0.3% to a continuously flowing, constantly agitated, waste liquor in a tank at a temperature in the range of 190°–200°F and at a flow rate through the tank yielding an approximate retention time of 15 minutes in the tank;
   adding lime at a rate to yield a weight to volume concentration in the range of 1.0–2.0% and flocculating the continuously flowing, constantly agitated, acidulated liquor in a second tank at a temperature in the range of 200°F at a flow rate through the second tank yielding an approximate retention time of 15 minutes in the tank forming a conditioned sludge;
   separating the conditioned sludge in a settling tank maintained at approximately 200°F to form a disposable supernatent liquor and a settled non drainable sludge; and
   centrifugally separating the settled non drainable sludge to form disposable liquid and solid constituents, where the temperature during the acidulating step and the weight to volume concentration of lime are selected from the ranges described to obtain a non drainable sludge.

* * * * *